United States Patent
Currie

[11] 3,866,139
[45] Feb. 11, 1975

[54] APPARATUS FOR LASER FREQUENCY SELECTION

[75] Inventor: George D. Currie, Ann Arbor, Mich.

[73] Assignee: The United States of America as represented by the Secretary of the United States Air Force, Washington, D.C.

[22] Filed: Oct. 11, 1973

[21] Appl. No.: 405,620

[52] U.S. Cl. ........ 331/94.5 C, 331/94.5 M, 350/150
[51] Int. Cl. ............................ H01s 3/00, G02f 1/26
[58] Field of Search .... 331/94.5 M, 94.5 C, 94.5 Q, 331/94.5 S; 350/150

[56] References Cited
UNITED STATES PATENTS

| | | | |
|---|---|---|---|
| 3,358,243 | 12/1967 | Collins et al. | 331/94.5 C |
| 3,412,251 | 11/1968 | Hargrove | 331/94.5 M |
| 3,436,678 | 4/1969 | Sharp et al. | 331/94.5 S |

*Primary Examiner*—Ronald L. Wibert
*Assistant Examiner*—Paul K. Godwin
*Attorney, Agent, or Firm*—Harry A. Herbert, Jr.; Richard J. Killoren

[57] ABSTRACT

A laser system having a lasing medium positioned between a pair of mirrors defining a resonant cavity. An etalon is positioned within the cavity with its mirrors perpendicular to the axis of the resonant cavity and use is made of the frequency selectivity of the transmission characteristics of the etalon. The output of the laser is linearly polarized and a quarter wave plate is positioned on each side of the etalon within the cavity. The reflected light from the etalon having passed through the one quarter wave plate twice is linearly polarized in a 90° direction to the transmission of the linear polarizer. The light transmitted by the etalon passes through two quarter wave plates twice and is polarized with the proper polarization for transmission through the linear polarizer. A piezoelectric transducer is used to vary the spacing of the etalon mirrors to make the laser frequency selective.

3 Claims, 5 Drawing Figures

PATENTED FEB 1 1 1975　　3,866,139

3,866,139

APPARATUS FOR LASER FREQUENCY SELECTION

RIGHTS OF THE GOVERNMENT

The invention described herein may be manufactured and used by or for the Government of the United States for all governmental purposes without the payment of any royalty.

BACKGROUND OF THE INVENTION

Most lasers are inherently multi-mode devices. Thus, available output energy is distributed throughout many discrete narrow frequency bands, thereby limiting the energy available at a particular frequency. Various systems have been devised for causing a laser to emit a single frequency output. Some of these systems make use of a Fabry-Perot interferometer or etalon within the laser cavity. Several of these mode selection schemes, using tilt in-cavity etalons, have been described in the prior art, such as in the patent to Collins et al., U.S. Pat. No. 3,358,243. The disadvantage of using a tilted etalon is that it reflects radiation at wanted, as well as unwanted frequencies out of the laser cavity, which results in a loss of energy.

In some prior art systems, the etalon is aligned with the cavity mirrors. These systems depend upon the reflecting rather than the transmitting properties of the etalon. Since the reflectivity of a high finesse etalon does not vary rapidly with frequency, mode selection with an aligned etalon, depending upon the reflecting properties of the etalon, is effective only near threshold in the laser.

BRIEF SUMMARY OF THE INVENTION

According to this invention, a way of using the sharply selective transmitting properties of an aligned etalon is provided. This is accomplished by providing two quarter wave plates and where needed, a linear polarizer in the laser cavity. In lasers, such as Brewster window terminated gas discharge tubes, which provide a polarized beam, the separate polarizer is not needed.

A piezoelectric transducer is provided to change the interferometer length to make the laser frequency selective.

IN THE DRAWING

DETAILED DESCRIPTION OF THE INVENTION

Figure 1:
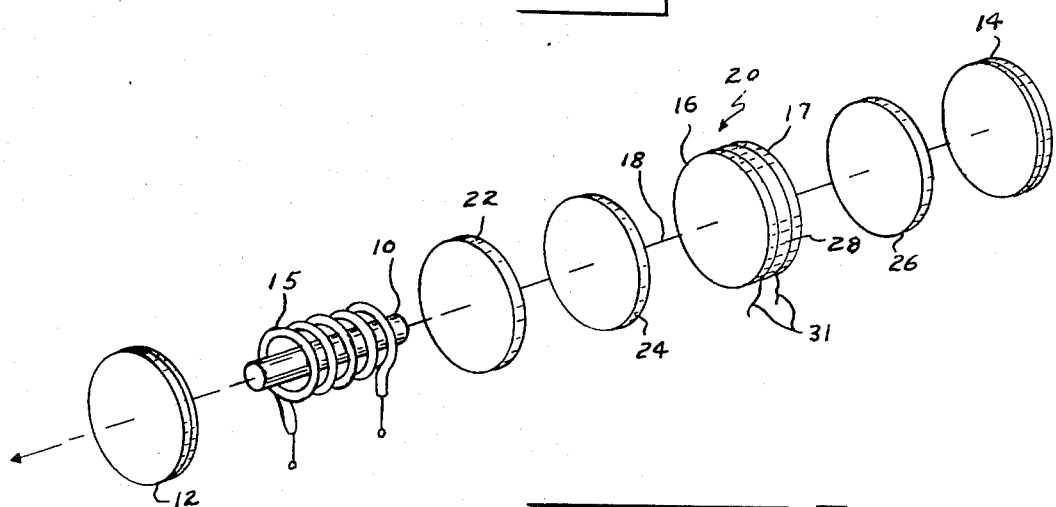
FIG. 1 is a diagrammatic sketch of a laser system according to the invention.

Reference is now made to FIG. 1 of the drawing which shows a conventional ruby rod 10 which is disposed within an optical cavity defined by a partially reflective mirror 12 and a totally reflective mirror 14. The ruby rod is pumped in a conventional manner such as by a flash tube 15 so as to emit coherent light which propagates along the central axis 18. A Fabry-Perot interferometer or etalon 20 is positioned within the optical cavity with its mirrors 16 and 17 parallel to the mirrors 12 and 14 and perpendicular to the central axis 18. A linear polarizer 22 is positioned between the ruby rod 10 and the etalon 20. A first quarter wave plate 24 is positioned between the etalon 20 and the polarizer 22. A second quarter wave plate 26 is positioned between the etalon 20 and the mirror 14. An annular piezoelectric element 28 may be provided to vary the spacing between the etalon mirrors 16 and 17 to make the laser frequency selective.

An etalon having two plane mirrors set parallel to each other and separated by distance L has resonance whenever:

$$\nu = nc/2L \tag{1}$$

where $n$ is an integer, $c$ is the speed of light and $\nu$ is the frequency. At the resonance frequency the etalon transmission is very high. Theoretically it can be 100° but practically it is not because of absorption. Away from resonance, the etalon reflects light incident on it. Therefore, it is a wavelength or frequency selective device. When $n$ changes $\pm 1$, the resonance relation above can be satisfied by light of a different frequency $\nu'$. The frequency separation between resonances then is:

$$\Delta\nu = \nu - \nu' = c/2L \tag{2}$$

Figure 3:
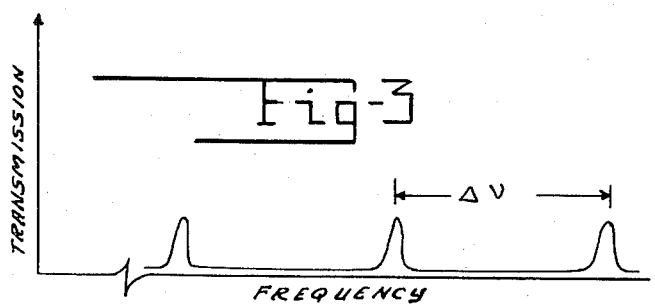
FIG. 3 shows a typical transmission vs. frequency characteristic curve for an etalon, such as used in the device of FIG. 1.

A typical transmission vs. frequency characteristic curve for an etalon is shown in FIG. 3. From Equation 2 above, it can be seen that the separation between resonances $\Delta\nu$ can be varied by changing L and can be made larger by making L small.

Figure 4:
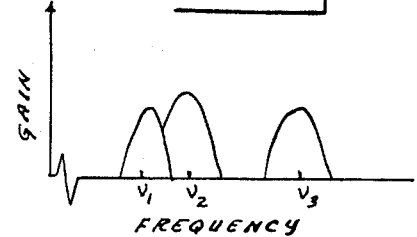
FIG. 4 shows a typical gain vs. frequency characteristic curve for a laser system.

A laser gain medium can have a gain over many wavelength regions as illustrated in FIG. 4.

Figure 5:
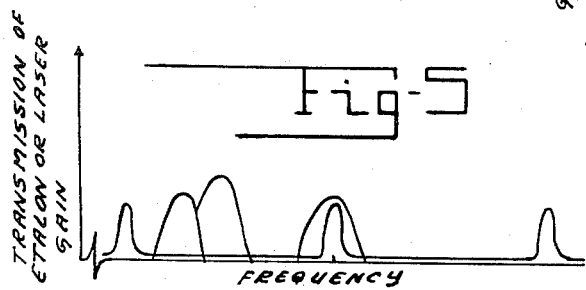
FIG. 5 shows the etalon transmission resonance coincidence with the laser gain region at desired frequency region according to the invention.

Thus, by providing a separation between etalon resonances, such that there is coincidence of the etalon resonance and laser medium gain region only at the desired frequency, as shown in FIG. 5, the laser will operate only in this region.

In those regions where the etalon does not transmit it acts as a reflector. Thus, in these regions the gain medium sees the etalon as a mirror so that laser oscillations could occur at unwanted frequencies. The arrangement of polarizer and quarter-wave plates of this invention are provided to prevent these frequencies from oscillating while not significantly disturbing the cavity resonance for the desired frequency.

The radiation from the rod 10 is linearly polarized by polarizer 22 and circularly polarized by the quarter wave plate 24. Radiation reflected back by the etalon 20 emerges from plate 24 linearly polarized with a direction of polarization 90° to that needed for transmission through polarizer 22.

The desired narrow band radiation transmitted through the etalon 20 passes through the quarter wave plate 26 and emerges linearly polarized in a 90° direction to the transmission direction of polarizer 22. It is reflected by mirror 14 and again passes through plate 26 emerging circularly polarized. It is again transmitted by the etalon 20 and then passes through the quarter wave plate 24 emerging in the proper polarization for transmission through the polarizer 22. Thus, the desired frequency is selected by the system.

Figure 2:
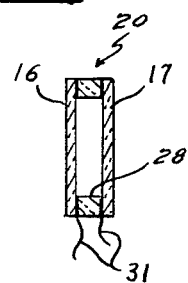
FIG. 2 shows a partially schematic sectional view through the center of one type of etalon, with a piezoelectric control element, which may be used with the device of FIG. 1.

The frequency selected by the system depends upon the transmission of the etalon. This frequency can be varied in a number of ways known in the art. One way in which the transmission of the etalon can be varied is to vary the spacing between the mirrors of the etalon. This may be accomplished as shown in FIG. 2. In this device, the mirrors are permanently aligned to each other by gluing the mirrors 16 and 17 to a hollow cylindrical piezoelectric stack shown schematically at 28. The spacing between the mirrors is varied by applying a drive voltage to leads 31. Devices such as this are commercially available. This device can be mounted on a conventional X-Y gimbal to align it with the laser axis. Though flat mirror elements are shown, curved mirrors may be used. These have certain advantages, such as making the interferometer easier to align and providing higher transmission.

Also other known apparatus for providing a variation in spacing between the mirror could be used, such as known devices wherein one mirror is secured to the piezoelectric element mounted in a first mount of a conventional interferometer mount with the second mirror being secured to an X-Y gimbal mount which is secured to a laser translation stage of the interferometer mount. These mounts also include leveling elements.

While the device has been described for use with a ruby laser, it is to be understood that other type lasers could be used. However, due to the high insertion losses of the several optical elements which must be located in the laser cavity, it would normally not be used with low gain lasers such as the He—Ne laser. It should be very useful however with dye lasers and diode lasers.

There is thus provided a frequency selection system for a laser which makes use of the sharply selective transmitting properties of an aligned etalon.

I claim:

1. A laser system comprising: first and second reflecting surfaces spaced from each other along an axis and defining a resonant cavity; a lasing medium within said cavity; means for pumping said lasing medium; said lasing medium having gain over a plurality of frequency regions within said cavity; means for linearly polarizing the light output of said lasing medium; a first quarter wave plate within said cavity, between said lasing medium and one of said reflecting surfaces, adapted to convert said linearly polarized light to circularly polarized light; a second quarter wave plate, spaced from said first quarter wave plate, between said first quarter wave plate and said one of said reflecting surfaces, adapted to convert said circularly polarized light to linearly polarized light; an etalon, having third and fourth reflecting surfaces, positioned between said first and said second quarter wave plates within said cavity, with the reflecting surfaces of said etalon being positioned perpendicular to said axis; said etalon including means for setting its transmission characteristic to coincide with only one predetermined frequency gain region of the lasing material.

2. The device as recited in claim 1, including means for varying the spacing between the reflecting surfaces of said etalon.

3. The device as recited in claim 2 wherein said means for varying the spacing between the reflecting surfaces of the etalon includes a hollow cylindrical piezoelectric transducer positioned between the mirrors of the etalon.

* * * * *